R. D. HIGGINBOTHAM.
CLUTCH.
APPLICATION FILED OCT. 3, 1917.

1,300,965.

Patented Apr. 15, 1919.
2 SHEETS—SHEET 2.

R.D. Higginbotham
Inventor

By Geo. I. Kimmel
Attorney

UNITED STATES PATENT OFFICE.

ROBERT D. HIGGINBOTHAM, OF SAN FRANCISCO, CALIFORNIA.

CLUTCH.

1,300,965.     Specification of Letters Patent.     Patented Apr. 15, 1919.

Application filed October 3, 1917. Serial No. 194,499.

*To all whom it may concern:*

Be it known that I, ROBERT D. HIGGINBOTHAM, a citizen of the United States, residing at San Francisco, in the county of San Francisco and State of California, have invented certain new and useful Improvements in Clutches, of which the following is a specification.

This invention relates to clutches and it is the dominant object of the invention to provide a clutch which, when the coöperative elements thereof are engaged, will eliminate the usual sudden shock or stress imparted to the driving and driven shafts incident to the operation, thus, relieving the said driving and driven shafts of considerable strain.

It is also an object of the invention to provide a clutch, the construction of which includes primary and secondary engaging elements, the secondary engaging element being of the friction type and adapted to contact with its coöperating element, previous to the engagement of said primary element.

Other independent objects are to provide features of construction of portions of the clutch which tend toward the attainment of the above aims irrespective of the relation in which they are used.

Other objects will be in part obvious and in part pointed out hereinafter.

The invention accordingly consists in the features of construction, combination of elements and arrangement of parts which will be exemplified in the construction hereinafter set forth, and the scope of the application of which will be indicated in the following claims.

In the accompanying drawings, wherein is shown one of various possible embodiments of my invention;—

Fig. 4 is a fragmentary detail and transverse section through the clutch taken on line 4—4 of Fig. 1; and Fig. 5 is a similar view taken on the line 5—5 of Fig. 1.

Similar characters of reference refer to similar parts throughout the several views of the drawings.

Figure 1:
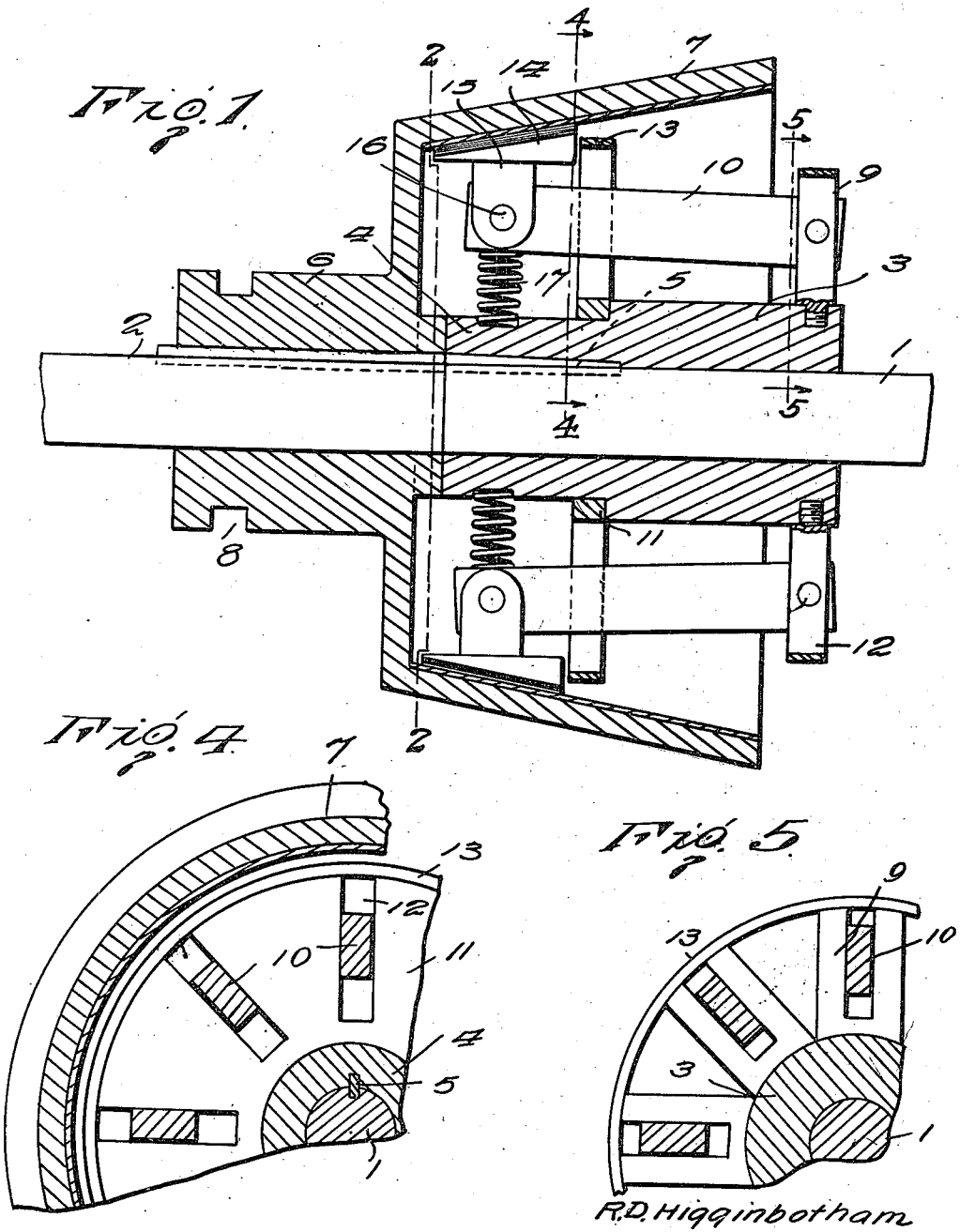
Figure 1 is a vertical longitudinal section through the improved clutch.
Figure 2:
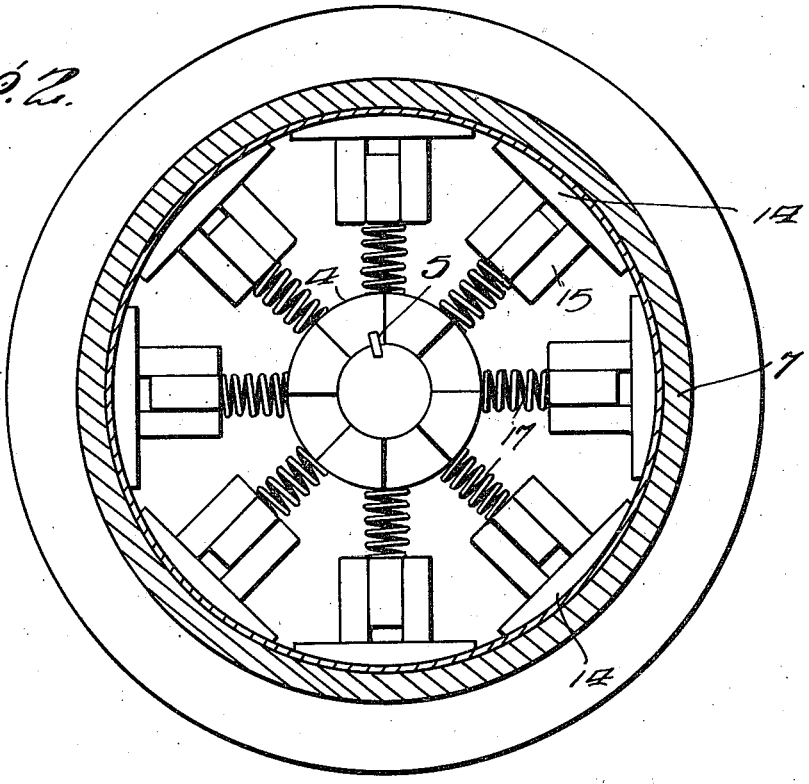
Fig. 2 is a vertical transverse section therethrough taken on the line 2—2 of Fig. 1.
Figure 3:
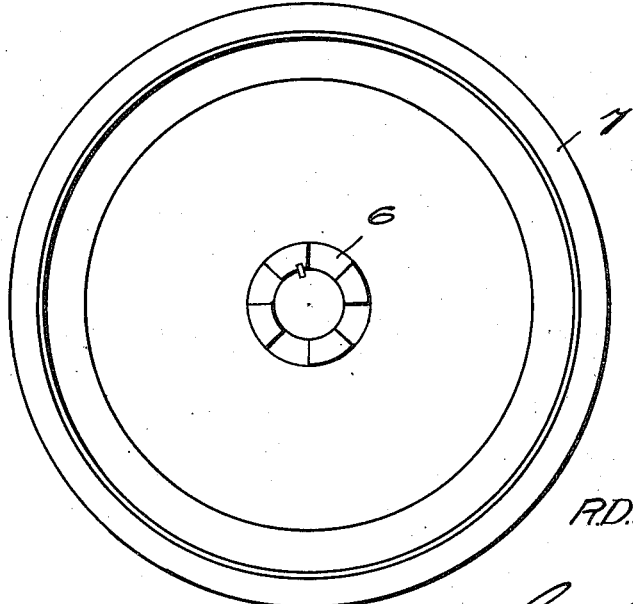
Fig. 3 is an end elevation of the movable clutch element.

Having more particular reference to the drawings, 1 represents a driving shaft and 2 the driven shaft, the driving shaft 1 being provided with an immovable clutch member comprising a hollow cylindrical element 3, one end of which is reduced as at 4 and provided with the usual clutch teeth, the purpose of which will be presently apparent. As will be understood, the element 3 is keyed to the driving shaft 1 as at 5.

Splined to the adjacent end of the driven shaft 2 is a movable clutch element including a hub member 6 having a substantially frusto-conical drum 7 formed integral therewith and the usual serrated portion or clutch teeth on the adjacent end thereof. An annular way 8 is formed in the peripheral surface of the hub member 6 and, as will be understood, permits the same to be engaged by a suitable operating lever not shown.

A plurality of circumferentially arranged openings are formed in the element 3 and fixedly receive therein bifurcated bearing brackets 9, which bearing brackets in turn, pivotally supports the outer ends of arms 10.

Securely mounted upon the reduced portion 4 of the element 3 is an annular disk 11 having a plurality of radially disposed slots 12 formed therein, through which the intermediate portion of the pivotal arms 10 extend. In this way, it will be appreciated that efficient guide means will be provided each of the pivotal arms 10, thus limiting their movement to the proper extent. About the peripheral surface of the disk 11 there is arranged a band 13, which band by closing the outer ends of the radially disposed slots 12 limits the outward movement of the pivotal arms 10.

Frictional clutch shoes 14 are provided and have the shanks 15 thereof pivotally connected to the adjacent ends of the arms 10 as at 16, while expansible coiled springs 17 are seated in suitable recesses formed in the adjacent portion 4 of the element 3 and, obviously, serve as means for normally forcing the said shoes 14 outwardly, the purpose of which will be subsequently apparent.

In operation, the lever connected to the movable clutch element 6 is moved to cause the sliding of the said element in a direction toward the immovable element 3, whereupon the frusto-conical drum 7 will engage the friction shoes 14 mounted upon the ends of the pivotal arms 10, thus effecting a connection between the driving and driven shafts 1 and 2 respectively. Upon further movement of the clutch element 6 the clutch teeth thereon will engage the clutch teeth of the element 3 thereby establishing a positive driving relation between the driving and driven shafts. Due to the manner in which the drive through the shafts 1 and 2 is established, it will be readily understood that all stress and shocks to the driving and driven shafts will be eliminated, for example, as when initially connecting the same.

Manifestly, the construction shown is capable of considerable modification and such modification as is within the scope of my claims, I consider within the spirit of my invention.

I claim:—

1. In combination with driving and driven shafts, interengageable clutch members carried on said shafts, longitudinally disposed arms pivoted to one of said clutch members and arranged thereabout, friction shoes pivoted to the free ends of said arms having their outer faces inclined, means carried by the last mentioned clutch member engaged with the free ends of the arms for normally moving the same outwardly to predetermined points, and a frusto-conical drum carried by the remaining clutch member and adapted to be engaged by said friction shoes immediately previous to engagement between the interengageable clutch members whereby to effect even transmission of rotary motion to the driven shaft.

2. In combination with driving and driven shafts, interengageable clutch members carried on said shafts, longitudinal arms pivoted to one of the clutch members and arranged thereabout, friction shoes pivoted to the free ends of said arms having their outer faces inclined, means carried by the last mentioned clutch member engaged with the free ends of the arms for normally forcing the same outwardly, radially disposed slotted guides on the last mentioned clutch member receiving the arms therethrough for limiting pivotal movement thereof, and a frusto-conical drum carried by the remaining clutch member adapted to be engaged by said friction shoes immediately previous to engagement between the clutch members whereby to effect the even transmission of rotary motion to the driven shaft.

In testimony whereof, I affix my signature hereto.

ROBERT D. HIGGINBOTHAM.